United States Patent Office 3,302,973
Patented Feb. 7, 1967

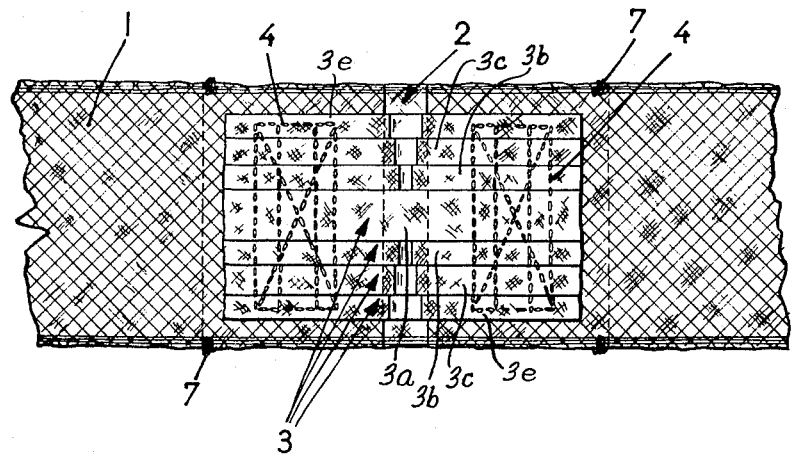
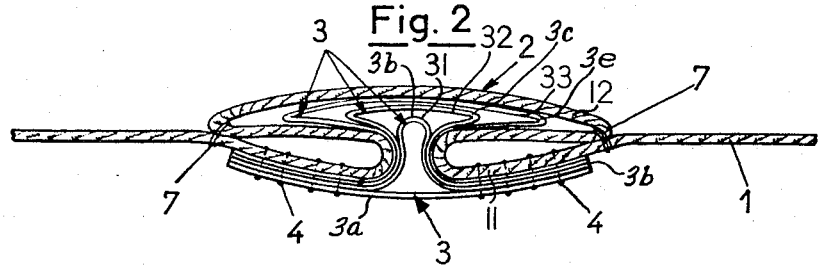
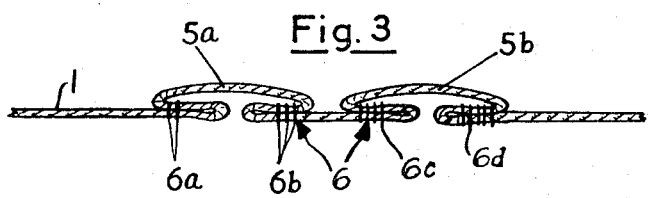

3,302,973
RETAINING STRAP SYSTEM
Jean Ravau, Comines, France, assignor to Etablissements Lambin & Ravau Societe a Responsabilite Limitee, Comines, Nord, France, a corporation of France
Filed May 10, 1965, Ser. No. 454,528
Claims priority, application France, May 15, 1964, 974,638, Patent 1,393,185
6 Claims. (Cl. 297—386)

The present invention relates to a controlled yield linkage member and is particularly concerned with a holding strap for a moving member and intended to minimize excessive stresses under conditions of sudden deceleration. The present invention may be applied in particular to parachutes, to fall-preventing safety devices and to safety belts for automobile occupants.

It is known that at the moment of opening a parachute the parachutist is subjected to a sudden deceleration which may impart forces in excess of one ton on his harness and may cause personal injury. The arrangement according to the present invention is intended to be placed between the harness and the suspension means to reduce these effects.

A similar problem is met with in the case of safety devices, in particular in constructional work for workers operating at high positions and who are at risk of falling. These devices consist of a belt or harness connected by a connecting element to a point sufficiently high to retain the worker before he strikes the ground or an obstacle. A resilient system should be interposed in the linkage; the devices according to the invention may advantageously replace this resilient device which may occupy space and cause objectionable oscillations if they are not properly damped.

Experience has shown that among the various existing automobile safety belts the most simple is undoubtedly the aircraft type formed by a single strap below the abdomen and placed flat on the upper part of the thighs. In effect in this arrangement the strap retains the base of the spine while allowing a rocking movement around the femoral heads which are held in this way which causes the upper part of the body to initiate a movement towards the front which absorbs the momentum due to deceleration forces and distributes them over the whole of the trunk.

Nevertheless, this movement tends to throw the head towards the edge of the dashboard or against the windscreen of the vehicle according to the seating position which requires a correct padding of projecting parts which might produce damage to the face of the driver or of the passenger.

Certain manufacturers have removed this disadvantage in part by providing a shoulder strap passing from the front over the shoulder in order to reduce substantially the pivoting movement of the upper part of the body towards the front. However, despite this precaution experience has shown that in the case of a sub-abdomen waist belt with a shoulder strap it is mainly the waist strap which retains the occupant, the shoulder strap merely opposing to a certain extent the pivotal movement above referred to.

Now a deceleration force of 1500 kg. for example will cause a movement of the body towards the front with an amplitude of 25 cm. which may cause compression and crushing of the occupant in his seat, it being understood that the shoulder strap generally fixed to the vehicle cannot elongate to a sufficient extent.

Straps, however, have a certain elasticity which after the shock may pull back the body of the occupant to the rear this is liable to produce injury, in particular at the level of the cervical vertebrae.

It is one object of the present invention to provide a retaining strap system which avoids these disadvantages and which consists in providing a belt or shoulder strap which is adapted to be subjected to a non-releasable elongation of a definite amount which is variable as a function of the value of the force to be absorbed, so that it can act in the manner of a shock absorber.

According to a first embodiment the system adopted may be formed by a fold disposed in folded condition by several strips, of synthetic material for example, of known resistance and respectively progressive in character and calculated so as to break successively under the action of predetermined traction forces.

These strips may have progressive resistances to traction extending in steps for example from 120 to 350 kg., and also of progressive lengths in order to allow on each occasion several centimetres of the fabric comprising the fold in the belt or strap to be released.

According to a second embodiment the strap may embody several folds maintained by sewing, the sewing having different strengths at different points so as to break one after the other under the effect of predetermined stresses.

In both cases such a design of a belt or strap permits deceleration forces to be absorbed while suppressing or substantially attenuating the objectionable influences of these forces on the body of the motorist, this damping system being equally valuable for shoulder belts of the "Swedish" type.

With these and other objects in view which will become apparent in the following detailed description, the present invention will be clearly understood in connection with the accompanying drawings, in which:

FIGURE 1 shows a strap provided with a safety fold according to the invention as seen from the inside and according to a first embodiment;

FIG. 2 is an end view of FIG. 1, showing the strips of different lengths and widths for maintaining the fold; and FIG. 3 shows a general view according to a second embodiment of a strap with a safety fold held by sewing of different progressive strengths.

Referring to the drawing and in particular to FIGURES 1 and 2, disclosing a first embodiment, a belt or strap 1 embodies a flattened double loop 2 formed by flat folds held by several strips 3 of synthetic material, which for example are suitably superposed and sewn at 4 and which provide different co-efficients of breakage, by variation of the widths, for example, in order to break successively under the effect of predetermined traction forces.

These strips 3 are likewise of different lengths, the shortest being the weakest.

In the embodiment shown in FIGS. 1 and 2, a multiple length-absorbing fold 2 is formed lengthwise on the belt or strap 1 from the material of said belt or strap, as indicated on the drawing, that is, having two mutually facing re-entrants folds 11 joined by a connecting ply 12. The multiple fold 2 so formed is suitably flattened and may be held in place by sewing threads 7 at the side edges of the strap or belt 1 at the points where the ply 12 merges into the two mutually facing folds 11.

The strips 3 are arranged side-by-side and are all of different lengths, with a central wider but shortest strip 3a which runs directly from one re-entrant fold 11 to the other. The strips 3b lying on each side of the central strip is a little longer and the spare material is folded inwardly into a fold 31 between the mutually facing re-entrant folds 11.

The next following pair of strips 3c are longer and form a broader fold 32 beneath the ply 12. The outermost pair of strips 3e are still longer and extend to a greater extent beneath the ply 12 as indicated at 33.

The ends of all the strips 3 lying one beside the other are sewn together to the lowermost face of the mutually facing re-entrant folds 11 by threads 4.

It will be seen that on the application of a predetermined traction force to the strap or belt 1 the center strip 3a will yield or fracture first, allowing a little expansion of the strap or belt until the folds 31 of strips 3b come into a straight position between the under faces of the re-entrant folds 11. Then a further traction pull will break the next following pair of strips 3c and so on progressively until all the strips fracture and the double loop 2 formed by the re-entrant folds 11 and the ply 12 is unfolded and no further yield is possible. The stitching threads 7 are so proportioned that the stitching threads 7 fracture first and do not interfere with the progressive yield of the belt or strap 1 under the effect of traction.

Referring now again to the drawings, and in particular to FIG. 3, disclosing a second embodiment, the strap 1 embodies several flattened loops 5a and 5b, for example, forming flat folds, each suitably held in position by means of sewing threads 6a, thus offering different resistances.

Thus, the first fold may comprise, for example, two lines of stitching threads 6a followed by three lines of threads 6b, followed by four lines of threads 6c, followed by five lines of threads 6d, etc., respectively, to provide progressive resistance. The same object may be attained by utilizing a thread of greater diameter for one fold than for the other.

Whatever the construction adopted, the breakage of the strips 3 (FIGS. 1 and 2) or of the stitching threads 6 (FIG. 3) determines the partial or complete opening of the fold or folds of the strap 1 which progressively absorbs momentum due to the deceleration forces.

When the fold or folds are open, the unit as a whole has a length which corresponds to an elongation of the strap of about 18 to 20 cm., and it is only after this operation has been completed that the relative elasticity of the strap itself operates to absorb the residual force.

It is obvious that the elongation of the strap may vary as a function of the type of vehicle utilized which permits, in certain cases, an increase in the size of the fold or folds as well as, the number of strips or areas of stitching.

Finally, it should be noted that in the first embodiment of FIGS. 1 and 2 and for reasons of appearance the zones of lateral stitching threads 7 which are of small strength ensure that the folds are held in position on the surface of the strap.

It should be understood that the present invention is not limited to the constructional examples described and shown but extends to all variations of shape, material and dimensions.

The arrangement may be adapted equally to any strap-like member intended to limit control momentum movement due to deceleration of a moving body, and particularly, to straps located between the harness and the suspension point of a parachute as well as connecting straps for anti-fall safety devices.

While I have disclosed several embodiments of the present invention, it is to be understood that these embodiments are given by example only and not in a limiting sense, the scope of the present invention being determined by the objects and the claims.

I claim:
1. A retaining strap system comprising a strap including a flattened loop means formed from an integral portion of said strap and a plurality of progressive fracture means adapted to hold said flattened loop means in a belt shortening condition, said progressive fracture means independent and spaced from each other and of different resistances such that on application of predetermined tensional forces to said strap said progressive fracture means yield and fracture sequentially, for corresponding different forces allowing a progressive increase in the length of said strap by release of said flattened loop means in said strap, providing energy absorption upon each yielding and fracturing and limited increase in the length of said strap by release of part of said flattened loop means in said strap without energy absorption therebetween.

2. The retaining strap system as set forth in claim 1, wherein said flattened loop means comprises a single fold loop having adjoining parts, said plurality of progressive fracture means comprises a series of progressively fracturing connecting strips which are each attached to said adjoining parts of said loop of said strap, and said strips are of progressively increasing lengths and adapted to yield successively to allow progressive opening of said loop and extension of said strap.

3. The retaining strap as set forth in claim 1, wherein said flattened loop means includes a plurality of successive loops, said progressive fracture means comprises zones of stitches, said successive loops retained in loop form by said zones of stitches, each of said zones of stitches being formed in a manner to offer a different resistance to breakage so that progressively increasing tensional forces in the strap result in progressive yield of said successive loops.

4. A device for retaining a moving body and intended to limit momentum movement due to sudden deceleration forces, comprising a connecting strap adapted to receive a predetermined irreversible elongation variable as a function of the deceleration force to be absorbed, said strap including a flattened loop forming a flat fold of material, a plurality of strips of different progressive lengths holding said flat fold and suitably superposed and sewn thereto in position, and each strip offering a different coefficient of fracture, so as to break successively under the effect of predetermined traction forces producing said irreversible elongation.

5. The device as set forth in claim 4, wherein said strap includes several folds held by sewing threads each having a different resistance.

6. The device as set forth in claim 4, wherein said strips are made of synthetic material, each strip having progressive resistances to traction progressing step-by-step from 120 to 350 kg., the fracture of each strip liberating on each occasion a predetermined length of said material of said flat fold, the total length thus provided being adapted to vary as a function of desired or permissible amplitude.

References Cited by the Examiner

UNITED STATES PATENTS

| | | | |
|---|---|---|---|
| 1,935,339 | 11/1933 | Tricau | 244—151 |
| 2,352,036 | 6/1944 | Tauty | 244—151 |
| 2,474,124 | 6/1949 | Schultz | 244—151 |
| 3,074,760 | 1/1963 | Hodgekin | 297—386 |
| 3,198,288 | 8/1965 | Presunka | 297—386 X |
| 3,232,383 | 2/1966 | Moberg | 297—386 |

FOREIGN PATENTS

| | | |
|---|---|---|
| 549,953 | 12/1942 | Great Britain. |
| 990,331 | 4/1965 | Great Britain. |

FRANK B. SHERRY, *Primary Examiner.*

JAMES T. McCALL, *Examiner.*